US012743800B2

(12) United States Patent
Kobayashi

(10) Patent No.: US 12,743,800 B2
(45) Date of Patent: Sep. 22, 2026

(54) IMAGE PROCESSING METHOD, STORAGE MEDIUM, IMAGE PROCESSING APPARATUS, MANUFACTURING METHOD OF TRAINED MODEL, AND IMAGE PROCESSING SYSTEM

(71) Applicant: CANON KABUSHIKI KAISHA, Tokyo (JP)

(72) Inventor: Masakazu Kobayashi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 742 days.

(21) Appl. No.: 18/069,514

(22) Filed: Dec. 21, 2022

(65) Prior Publication Data

US 2023/0128856 A1 Apr. 27, 2023

Related U.S. Application Data

(63) Continuation of application No. PCT/JP2021/018966, filed on May 19, 2021.

(30) Foreign Application Priority Data

Jul. 17, 2020 (JP) ................................ 2020-123171

(51) Int. Cl.
*H04N 23/61* (2023.01)
*G06T 7/50* (2017.01)

(52) U.S. Cl.
CPC ............... *G06T 7/50* (2017.01); *H04N 23/61* (2023.01); *G06T 2207/20081* (2013.01)

(58) Field of Classification Search
CPC ............. G06T 7/50; G06T 2207/20081; G06T 2207/20084; H04N 23/61; H04N 23/60; G01B 11/00; G01C 3/06
(Continued)

(56) References Cited

U.S. PATENT DOCUMENTS 8,194,993 B1 * 6/2012 Chen ......................... G06T 5/70 382/254
2010/0310176 A1 12/2010 Lin et al.
(Continued)

FOREIGN PATENT DOCUMENTS

JP 2018017568 A 2/2018
JP 2019016275 A 1/2019
(Continued)

OTHER PUBLICATIONS

Mishima. “Physical Cue based Depth-Sensing by Color Coding with Deaberration Network.” https://arxiv.org/abs/1908.00329v1 [cs.CV] Aug. 1, 2019. Cited in Specification.
(Continued)

*Primary Examiner* — Stephen P Coleman
(74) *Attorney, Agent, or Firm* — ROSSI, KIMMS & McDOWELL LLP

(57) ABSTRACT

An image processing method includes the steps of acquiring input data including a captured image and information about a state of an optical system that was used to capture the captured image, and estimating distance information about the captured image by inputting the input data into a machine learning model. The information about the state of the optical system includes at least one of a focal length, an F-number, and a focused object distance.

11 Claims, 14 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 2011/0091101 | A1* | 4/2011 | Cote | H04N 23/81 382/167 |
| 2012/0321211 | A1* | 12/2012 | Tsukagoshi | G06T 7/0002 382/255 |
| 2016/0314565 | A1* | 10/2016 | Campbell | G06T 5/80 |
| 2020/0090359 | A1* | 3/2020 | Pillai | G06V 10/82 |
| 2020/0167885 | A1 | 5/2020 | Kimura | |
| 2020/0294260 | A1 | 9/2020 | Kashiwagi et al. | |

FOREIGN PATENT DOCUMENTS

| | | | |
|---|---|---|---|
| JP | 2019129374 | A | 8/2019 |
| JP | 2020086891 | A | 6/2020 |
| JP | 2020148483 | A | 9/2020 |
| JP | 2021022250 | A | 2/2021 |
| JP | 7614754 | B2 | 1/2025 |

OTHER PUBLICATIONS

International Search Report issued in Intl. Appln. No. PCT/JP2021/018966 mailed Jul. 27, 2021. English translation provided.

Written Opinion issued in Intl. Appln. No. PCT/JP2021/018966 mailed Jul. 27, 2021.

English translation of Written Opinion issued in Intl. Appln. No. PCT/JP2021/018966 mailed on Jul. 27, 2021, previously cited in IDS filed Dec. 21, 2022.

International Preliminary Report on Patentability issued in Intl. Appln. No. PCT/JP2021/018966 on Jan. 17, 2023. English translation provided.

Kashiwagi et al. "Deep Depth From Aberration Map". IEEE/CVF International Conference on Computer Vision (ICCV). 2019: pp. 4069-4078.

* cited by examiner

FIG. 10

IMAGE PROCESSING METHOD, STORAGE MEDIUM, IMAGE PROCESSING APPARATUS, MANUFACTURING METHOD OF TRAINED MODEL, AND IMAGE PROCESSING SYSTEM

CROSS-REFERENCE TO RELATED APPLICATIONS

This application is a Continuation of International Patent Application No. PCT/JP2021/018966, filed on May 19, 2021, which claims the benefit of Japanese Patent Application No. 2020-123171, filed on Jul. 17, 2020, both of which are hereby incorporated by reference herein in their entirety.

BACKGROUND

Technical Field

One of the aspects of the disclosure relates to an image processing method for estimating distance information from a captured image captured with an optical system.

Description of the Related Art

Physical Cue based Depth-Sensing by Color Coding with Deaberration Network, https://arxiv.org/abs/1908.00329 ("Physical Cue") discloses a method of estimating distance information using a machine learning model from defocus blur in a captured image captured with a single optical system.

The method disclosed in Physical Cue causes estimating accuracy to lower or learning load and a stored data amount to increase in estimating distance information based on a captured image captured with an optical system in which various aberrations occur. In an optical system, defocus blur changes depending on a focal length, an F-number (aperture value), focused object distance, and the like. Therefore, the following two methods are conceivable in order to estimate the distance information from the defocus blur.

The first method is to train a machine learning model with learning (or training) data that includes all defocus blurs that can occur in the optical system. However, in a case where the training data includes a plurality of defocus blurs with similar shapes, the estimating accuracy of the distance information for each defocus blur lowers. The second method is to divide each defocus blurs that can occur in the optical system into a plurality of similar groups, and to individually train the machine learning model using the training data of each group. However, in this case, in the optical system in which various aberrations occur such as a high-magnification zoom lens, the number of groups becomes enormous, increasing the learning (or training) load and the stored data amount, which is a data amount that indicates a weight of the learned machine learning model. It is therefore difficult to maintain the estimating accuracy of the distance information and to suppress the learning load and the stored data amount.

SUMMARY

The disclosure provides an image processing method that can estimate distance information with high accuracy from defocus blur in a captured image by suppressing a learning load and a stored data amount of a machine learning model.

An image processing method according to one aspect of the disclosure includes the steps of acquiring input data including a captured image and information about a state of an optical system that was used to capture the captured image, and estimating distance information about the captured image by inputting the input data into a machine learning model. The information about the state of the optical system includes at least one of a focal length, an F-number, and a focused object distance. A non-transitory computer-readable storage medium storing a program that causes a computer to execute the above image processing method also constitutes another aspect of the disclosure. An image processing apparatus corresponding to the above image processing method also constitutes another aspect of the disclosure.

A learning method according to one aspect of the disclosure includes the steps of acquiring a training image, a ground truth image having distance information according to the training image, and information about a state of an optical system, and training a machine learning model based on the training image, the ground truth image, and the information about the state of the optical system. The information about the state of the optical system includes at least one of a focal length, an F-number, and a focused object distance. A non-transitory computer-readable storage medium storing a program that causes a computer to execute the above learning method also constitutes another aspect of the disclosure.

A manufacturing method of a trained model according to another aspect of the disclosure includes the steps of acquiring a training image, a ground truth image having distance information according to the training image, and information about a state of an optical system, training a machine learning model based on the training image, the ground truth image, and the information about the state of the optical system. The information about the state of the optical system includes at least one of a focal length, an F-number, and a focused object distance.

An image processing apparatus according to another aspect of the disclosure includes at least one processor, and a memory coupled to the at least one processor, the memory having instructions that, when executed by the processor, perform operations as an acquiring unit configured to acquire a training image, a ground truth image having distance information according to the training image, and information about a state of an optical system, and a learning unit configured to train a machine learning model based on the training image, the ground truth image, and the information about the state of the optical system. The information about the state of the optical system includes at least one of a focal length, an F-number, and a focused object distance.

An image processing system according to another aspect of the disclosure includes a first apparatus and a second apparatus that can communicate with each other. The first apparatus includes a transmission unit configured to transmit a request for executing processing for the captured image to the second apparatus. The second apparatus includes a receiving unit configured to receive the request, an acquiring unit configured to acquire input data including the captured image and information about a state of an optical system that was used to capture the captured image, and an estimating unit configured to input the input data into a machine learning model and to estimate distance information about the captured image based on the request. The information about the state of the optical system includes at least one of a focal length, an F-number, and a focused object distance.

Further features of the disclosure will become apparent from the following description of exemplary embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, in a case where executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

BRIEF DESCRIPTION OF THE DRAWINGS

FIG. 10 is a block diagram of an image processing system according to Example 2.

DESCRIPTION OF THE EMBODIMENTS

Figure 1:
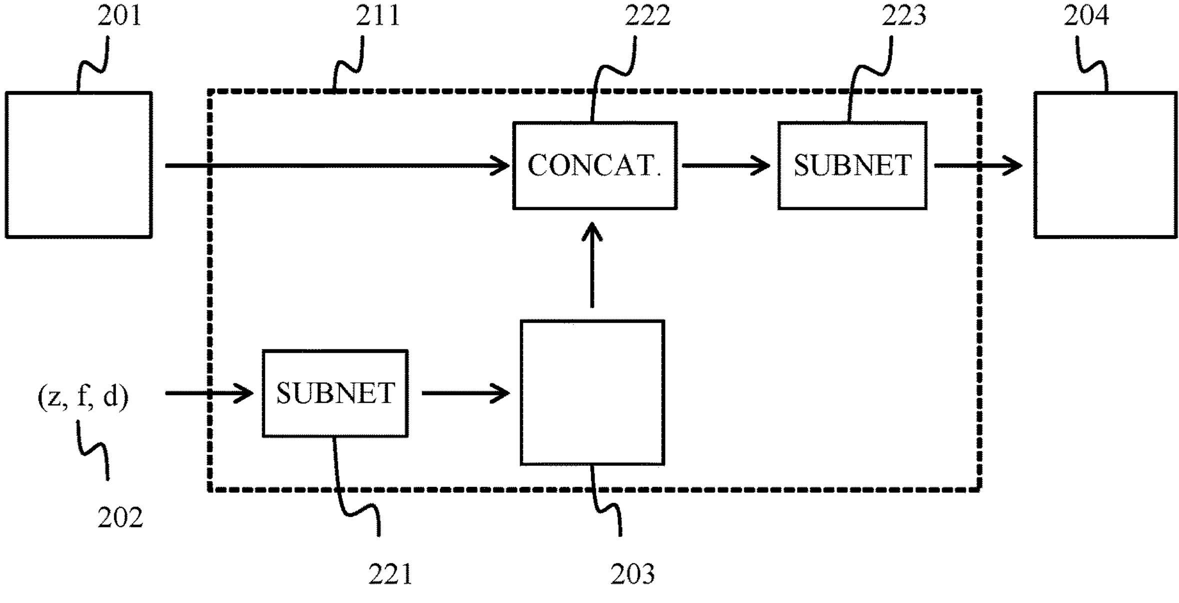
FIG. 1 illustrates a configuration of a machine learning model according to Example 1.

Referring now to the accompanying drawings, a detailed description will be given of embodiments according to the disclosure. Corresponding elements in respective figures will be designated by the same reference numerals, and a duplicate description thereof will be omitted.

The gist of the disclosure will be described before this embodiment is concretely described. The disclosure estimates distance information using a machine learning model from defocus blur in a captured image captured with a single optical system. Since the shape of the defocus blur changes according to a distance from an in-focus position, the distance information can be estimated using this property. The machine learning model includes, for example, a neural network, genetic programming, and a Bayesian network. The neural network includes Convolutional Neural Network (CNN) and the like. Input data input to the machine learning model includes a captured image and information about a state of an optical system that was used to capture the captured image. The state of the optical system includes, for example, a focal length, an F-number (aperture value), or a focused object distance of the optical system, but is not limited to them.

In training and post-training estimation of the machine learning model, by inputting information about the state of the optical system, the machine learning model can identify the state of the optical system that generates defocus blur affecting the captured image. Thereby, the machine learning model learns a weight that is used to estimate distance information that is different for each state of the optical system, even if training includes defocus blurs having various shapes. Therefore, the machine learning model can highly accurately estimate distance information for each defocus blur. This configuration can suppress the deterioration of the estimating accuracy of the distance information and enables the machine learning model to collectively learn learning data including defocus blurs having various shapes. As a result, the machine learning model can estimate distance information with high accuracy from defocus blur in a captured image while a learning load and a stored data amount can be suppressed.

In the following description, a stage of learning the weight of the machine learning model will be called a learning phase, and a stage of estimating distance information with the machine learning model and the learned weight will be called an estimating phase.

Example 1

Figure 2:
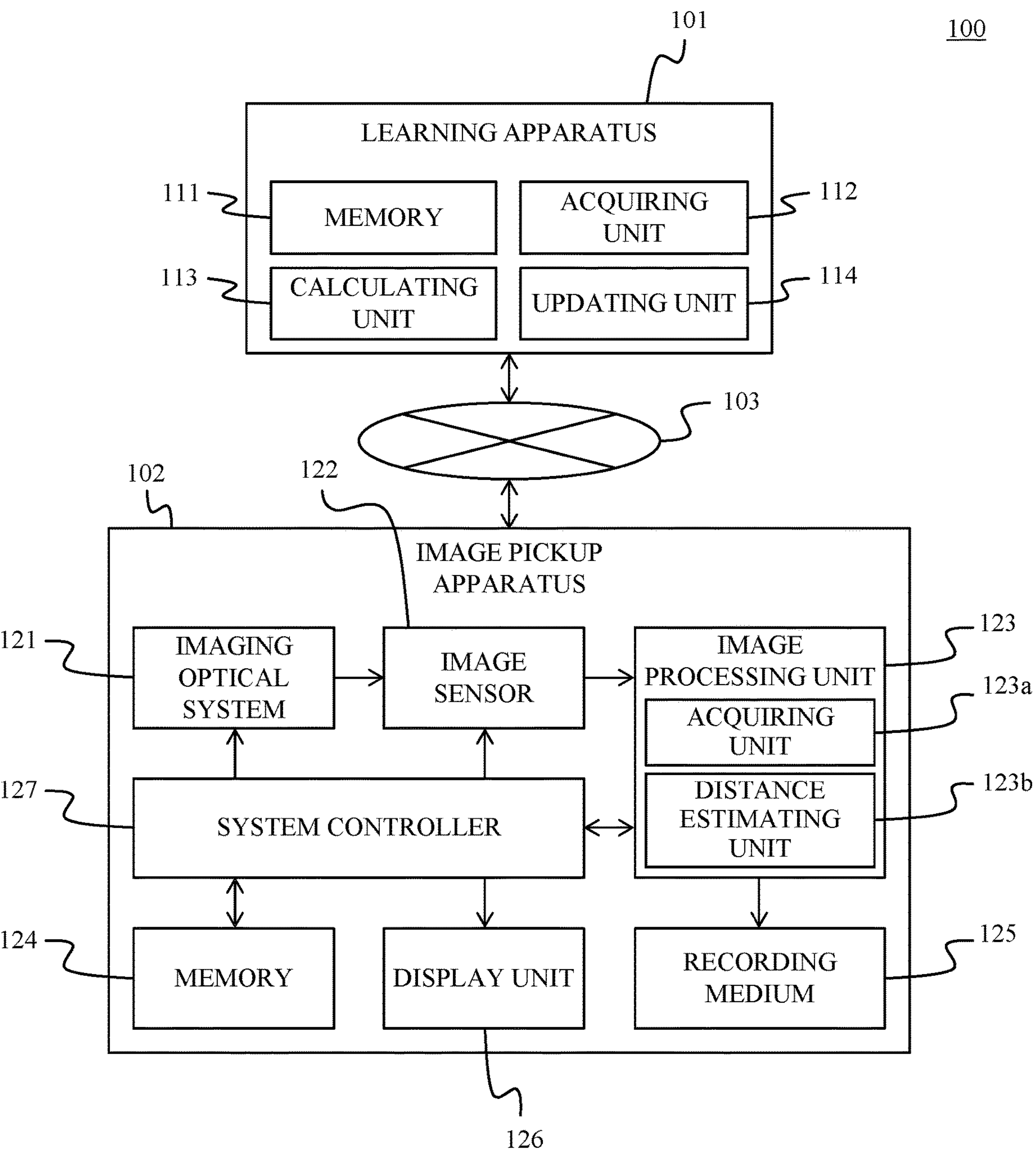
FIG. 2 is a block diagram of an image processing system according to Example 1.
Figure 3:
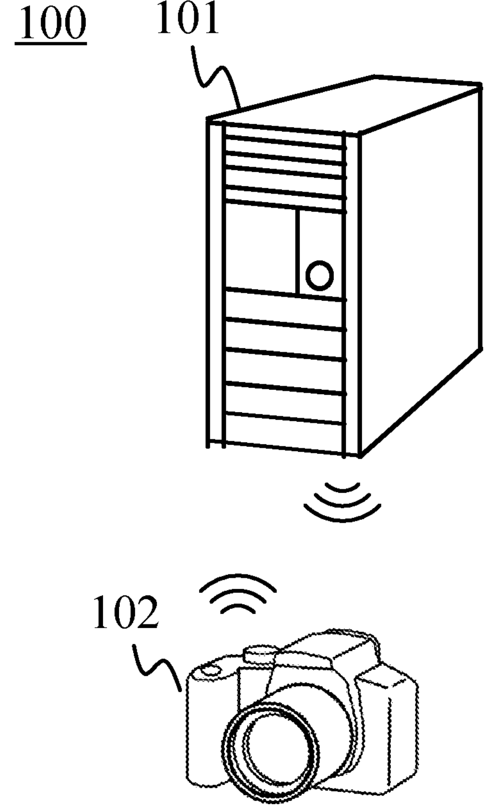
FIG. 3 is an external view of the image processing system according to Example 1.

Referring now to FIGS. 2 and 3, a description will be given of an image processing system according to Example 1 of the disclosure. FIG. 2 is a block diagram of an image processing system 100. FIG. 3 is an external view of the image processing system 100.

The image processing system 100 includes a learning apparatus 101, an image pickup apparatus (image processing apparatus) 102, and a network 103. The learning apparatus 101 and the image pickup apparatus 102 are connected via the wired or wireless network 103. The learning apparatus 101 includes a memory 111, an acquiring unit 112, a calculating unit 113, and an updating unit 114, and learns weights that are used to estimate distance information using a machine learning model (or to manufacture a trained model). The image pickup apparatus 102 acquires a captured image by imaging an object space, and estimates distance information about the captured image using weight information read out after or before imaging. A description will be given below of details of the weight learning performed by the learning apparatus 101 and the distance information estimation performed by the image pickup apparatus 102.

The image pickup apparatus 102 includes an imaging optical system (optical system) 121 and an image sensor 122. The imaging optical system 121 condenses light incident from the object space and forms an optical image (object image). The image sensor 122 converts the optical image into an electrical signal by photoelectric conversion and generates a captured image. The image sensor 122 is, for example, a Charge Coupled Device (CCD) sensor, a Complementary Metal-Oxide Semiconductor (CMOS) sensor, or the like.

An image processing unit 123 includes an acquiring unit 123*a* and a distance estimating unit 123*b*, and generates an estimated image (distance information image) by estimating distance information about the captured image. The learned weight information learned by the learning apparatus 101 is used to generate the estimated image. The weight information is stored in a memory 124. A recording medium 125 stores the estimated image. Alternatively, the captured image may be stored in the recording medium 125, and the image processing unit 123 may read out the captured image and generate the estimated image. A display unit 126 displays the estimated image stored in the recording medium 125 according to an instruction by a user. A system controller 127 controls the above series of operations.

Figure 4:
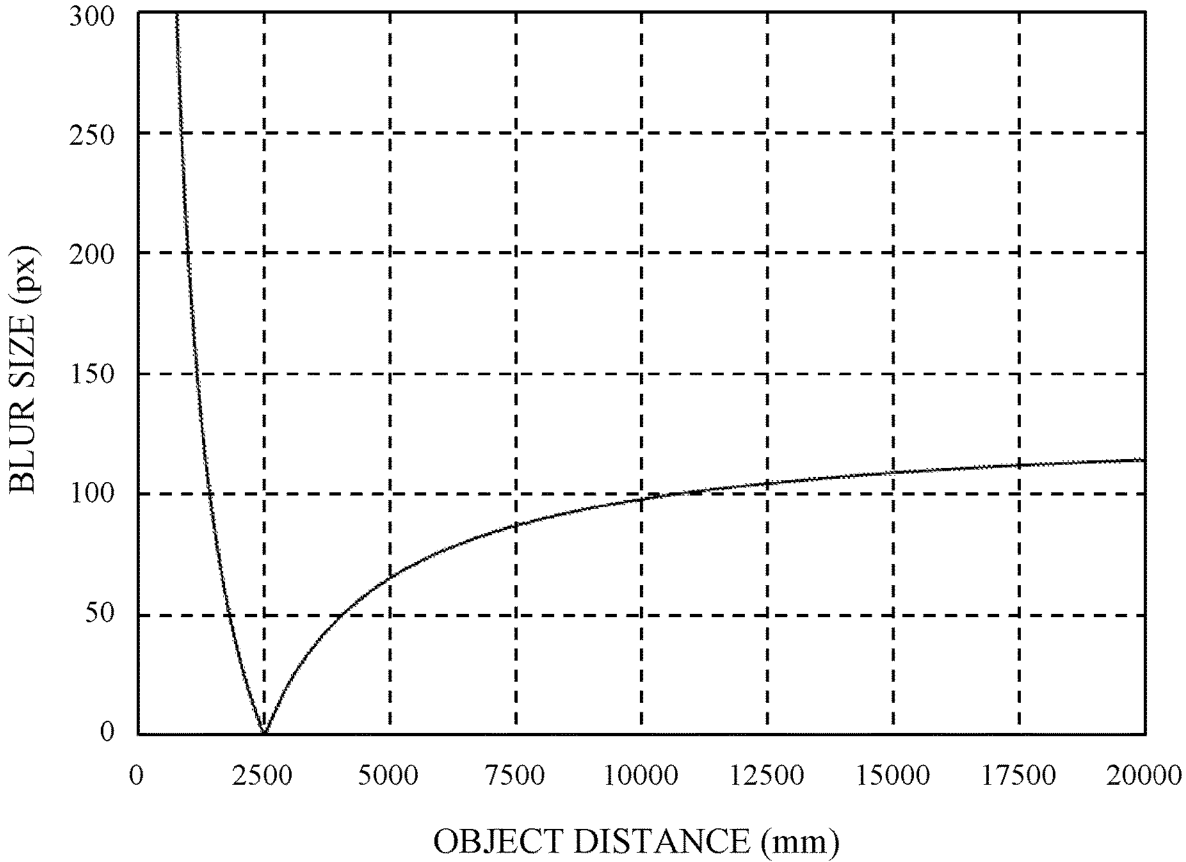
FIG. 4 illustrates a relationship between a magnitude of defocus blur and an object distance in Example 1.

Referring now to FIG. 4, a description will be given of a shape of defocus blur and an object distance. FIG. 4 illustrates a relationship between the magnitude of defocus blur and the object distance, and a geometrical optics calculation result of the relationship between the magnitude of on-axis defocus blur (pixels) and the object distance (mm). In FIG. 4, an abscissa axis indicates the object distance (mm), and an ordinate axis indicates the magnitude of defocus blur (px). The calculation condition is set by an in-focus position of 2500 mm, an F-number of 1.4, a focal length of 50 mm, and a pixel pitch of 5.5 μm.

The defocus blur size increases as the object moves away from the in-focus position. For example, the defocus blur is about 65 pixels in a case where the object distance is 5000 mm, and the defocus blur is about 75 pixels in a case where the object distance is 6000 mm. On the other hand, in a case where the object distance is 1700 mm, the defocus blur is also about 65 pixels, and the magnitude of defocus blur is the same as that in a case where the object distance is 5000 mm. However, in an actual optical system, the intensity distribution is different due to the influence of aberration even if the size of the Point Spread Function (PSF) is the same. In this example, the size of the PSF corresponds to a range in which the PSF has intensity, and the shape of the PSF corresponds to the intensity distribution of the PSF. Therefore, distance information can be estimated by distinguishing defocus blur at 5000 mm and defocus blur at 1700 mm from each other. More specifically, different intensity distributions cause differences in Gaussian blur, ball blur, double-line blur, and the like.

Figure 5A:
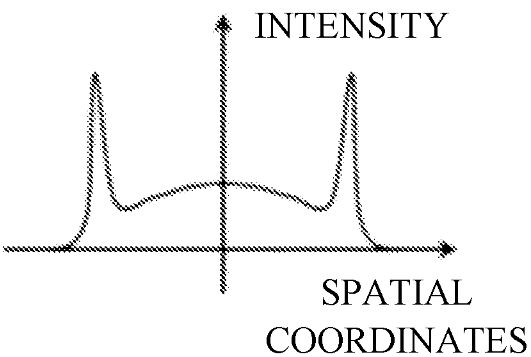
FIGS. 5A, 5B, and 5C illustrate a point spread function (PSF) at a defocus position in Example 1.
Figure 5B:
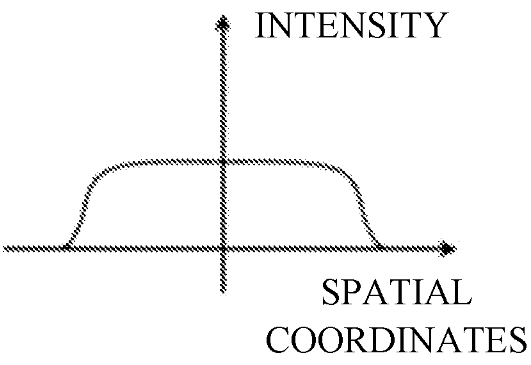
Figure 5C:
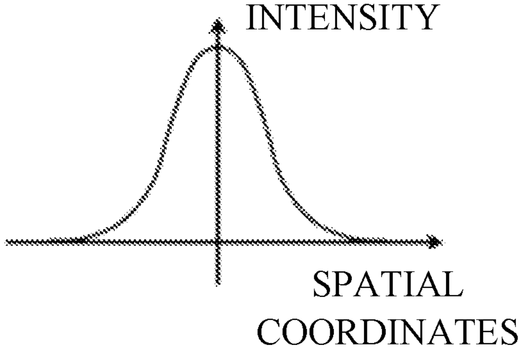

Referring now to FIGS. 5A, 5B, and 5C, a description will be given of the double-line blur, ball blur, and Gaussian blur. FIG. 5A illustrates the PSF of the double-line blur. In FIG. 5A, an abscissa axis indicates spatial coordinates (position), and an ordinate axis indicates intensity. This is similarly applied to FIGS. 5B and 5C, which will be described below. As illustrated in FIG. 5A, the double-line blur has a PSF with two separated peaks. In a case where a PSF at a defocus distance has a shape as illustrated in FIG. 5A, an object, which is originally a single line, appears to be double blurred in a defocus state. FIG. 5B illustrates the PSF of the ball blur. The ball blur has a PSF that is flat in intensity. FIG. 5C illustrates the PSF of the Gaussian blur. The Gaussian blur has a Gaussian-distributed PSF. As described above, there is a correlation between the shape of the defocus blur and the object distance, and distance information can be estimated from the shape of the defocus blur.

Figure 6:
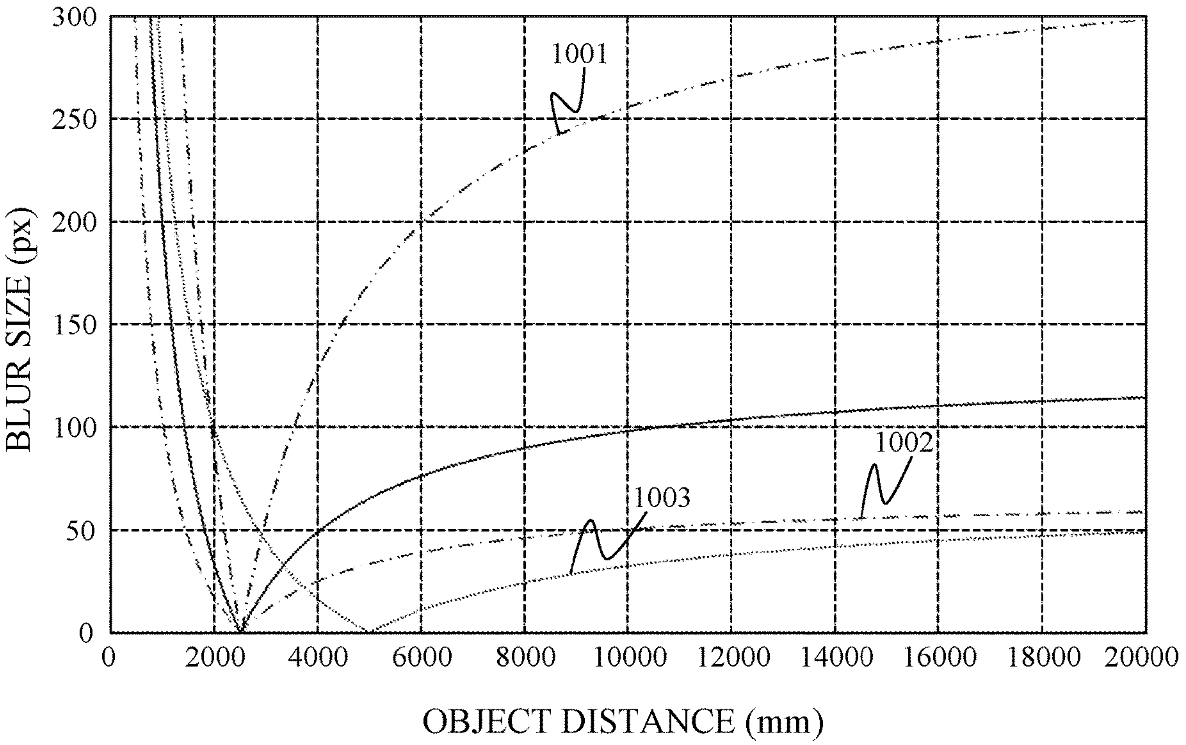
FIG. 6 illustrates a relationship between a magnitude of defocus blur and an object distance in a case where a lens state is changed in Example 1.

Referring now to FIG. 6, a description will be given of the shape of defocus blur and a lens state (focal length, F-number, focused object distance). The shape of defocus blur changes depending on the lens state. FIG. 6 illustrates a relationship between the magnitude of defocus blur and the object distance in a case where the lens state is changed. FIG. 6 illustrates geometrical optics calculation results of the relationship between the magnitude of on-axis defocus blur (pixels) and the object distance (mm) in a case where each of the focal length, F-number, and focused object distance is changed from the lens state in FIG. 4. The results of FIG. 6 are obtained by changing the focal length to 80 mm (alternate long and two short dashes line 1001), the F-number to F2.8 (alternate long and short dash line 1002), and the focused object distance to 5000 mm (dotted line 1003) from the lens state in FIG. 4.

As illustrated in FIG. 6, the relationship between the magnitude of defocus blur and the object distance changes according to the lens state. That is, as the lens state changes, there are many object distances corresponding to a specific defocus blur amount. As described above, since the number of defocus blurs in a specific lens state is small, distance information can be estimated from the intensity distribution of the PSF. However, in a case where the number of defocus blurs to be learned increases, it becomes difficult to estimate the distance information only from the shape of the defocus blur, and the estimating accuracy lowers. Accordingly, this example inputs information about the state of the optical system together with the captured image into the machine learning model, so that it learns a weight for estimating distance information that is different for each state of the optical system. This configuration can highly accurately estimate distance information for each defocus blur.

Figure 7:
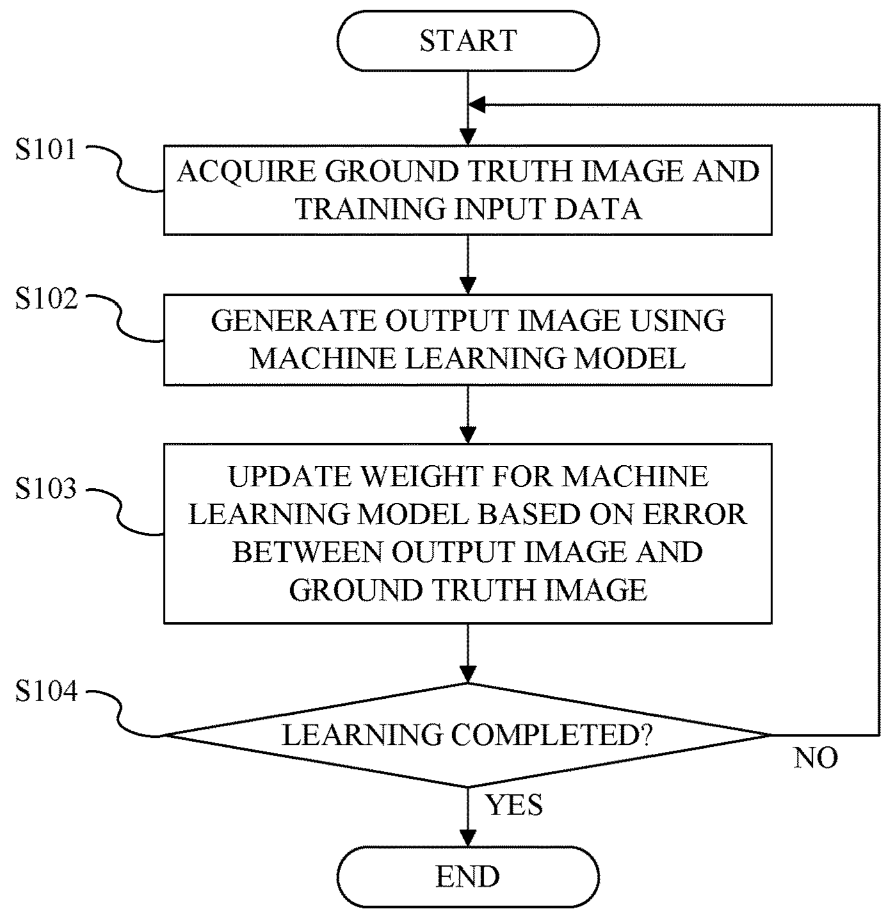
FIG. 7 is a flowchart of weight learning in Examples 1 to 3.

Referring now to FIG. 7, a description will be given of weight learning (learning phase) executed by the learning apparatus 101. FIG. 7 is a flowchart for learning a weight (or a manufacturing method of a trained model). Each step in FIG. 7 is mainly executed by each component in the learning apparatus 101. This embodiment uses the CNN for the machine learning model, but may use another model similarly.

First, in step S101, the acquiring unit 112 acquires one or more pairs of ground truth images and training input data from the memory 111. The training input data are input data in the learning phase of the CNN. The training input data includes a training image and information about the state of the optical system corresponding to the training image. The training image and the ground truth image are a pair of an image affected by defocus blur and a distance information image corresponding to the defocus blur. The training image is an image affected by the defocus blur, and the ground truth image is a distance information image corresponding to the defocus blur. The distance information image has the same number of elements (number of pixels) as that of a single channel component of the training image. As an example, a case where the distance information image has numerical values normalized based on a permissible range of an object distance will be illustrated. Normalized 1 is calculated by the following expression (1):

$$l = \frac{L - L_{min}}{L_{max} - L_{min}} \tag{1}$$

where L is the object distance, and $L_{min}$ and $L_{max}$ are the minimum and maximum values of the object distance, respectively.

The way of acquiring the numerical value is not limited, and the shortest distance may be set to 1 and the farthest distance from the image pickup apparatus may be set to 0. The distance information image may be set to a numerical value normalized based on an available magnitude of defocus blur instead of the numerical value normalized based on the permissible range of the object distance. In this case, the same magnitude of defocus blur exists before and after the focused object distance. It is therefore desirable to have information that can be used to distinguish the front defocus and the back defocus from each other. For example, the first channel of the distance information image may be set to the numerical value normalized based on the magnitude of defocus blur, and the second channel may be set to a numerical value indicating the positional relationship between a position before the focused object distance and a position after the focused object distance. A single training image is affected by defocus blur at a specific focal length, a specific F-number, and a specific focused object distance.

Information about the state of the optical system corresponding to the training image is information indicating at least one of the specific focal length, the specific F-number, and the specific focused object distance. In other words, the information about the state of the optical system is the information that identifies the defocus blur that affects the training image. In this example, the information about the state of the optical system includes all of the focal length, the F-number, and the focused object distance. However, this example is not limited to this illustration, and the information about the state of the optical system may include only part of the focal length, the F-number, and the focused object distance, or may include other information.

An example of a method for generating the ground truth image and the training input data stored in the memory 111 will be illustrated below. A first example is a method of performing imaging simulation using an original image as an object. The original image is an actually captured image, a Computer Graphics (CG) image, or the like. The original image may be an image having edges with various intensities and directions, textures, gradations, flat portions, etc., so that distance information can be correctly estimated for various objects. One or more original images may be used. The training image is an image obtained by applying defocus blur to the original image and performing the imaging simulation.

This example applies defocus blur generated in the state (Z, F, D) of an imaging optical system 121, where Z indicates the focal length, F indicates the F-number, and D indicates the state of the focused object distance. In a case where the image sensor 122 acquires a plurality of color components, defocus blur of each color component is applied to the original image. The defocus blur can be applied by convolving the original image with the PSF or by taking the product of the frequency characteristics of the original image and an Optical Transfer Function (OTF). The information about the state of the optical system corresponding to the training image with the defocus blur specified by (Z, F, D) is information specifying (Z, F, D).

The ground truth image is a distance information image corresponding to the defocus blur. The ground truth and training images may be undeveloped RAW images or developed images. A plurality of different (Z, F, D) defocus blurs are applied to one or more original images to generate a plurality of sets of ground truth images and training images.

In this example, estimations of distance information for all defocus blurs generated in the imaging optical system 121 are collectively learned. Therefore, (Z, F, D) is changed within a permissible range of the imaging optical system 121, and a plurality of sets of ground truth images and training images are generated. Even at the same (Z, F, D), there are a plurality of defocus blurs depending on the image height and azimuth, so pairs of ground truth and training images are generated for different image heights and azimuths.

The original image may have a signal value higher than a luminance saturation value of the image sensor 122. This is because in a case where the image pickup apparatus 102 captures an image under a specific exposure condition, there are objects, even actual objects, whose luminances do not fall under the saturation value. The ground truth image is generated by clipping the signal of the original image with the luminance saturation value of the image sensor 122. The training image is generated by applying blur to it and then clipping it with the luminance saturation value.

A second example of the method of generating the ground truth image and the training input data is to use an actually captured image by the imaging optical system 121 and the image sensor 122. The imaging optical system 121 captures an image in the (Z, F, D) state to obtain a training image. Information about the state of the optical system corresponding to the training image is information for specifying (Z, F, D). The ground truth image is obtained by acquiring distance information in capturing the training image. The distance information can be obtained by using a Time of Flight (ToF) sensor or the like, or by using a measuring instrument such as a tape measure in a case where the captured object is at the same distance at all angles of view. A partial area having a predefined number of pixels may be extracted from the training image and the ground truth image generated by the two methods described above and used for learning.

Next, in step S102 of FIG. 7, the calculating unit 113 inputs the training input data into the CNN and generates an output image. Referring now to FIG. 1, a description will be given of generation of the output image in this example. FIG. 1 illustrates the configuration of the machine learning model. The training input data includes a training image 201 and information (z, f, d) 202 about a state of an optical system. The training image 201 may be grayscale or have a plurality of channel components. This is similarly applied to the ground truth image. (z, f, d) 200 is normalized (Z, F, D). Normalization is made based on the permissible range of the imaging optical system 121 for each of the focal length, the F-number, and the focused object distance.

For example, assume that Z is a focal length, F is an F-number, and D is a reciprocal of an absolute value of a distance from the image pickup apparatus 102 to a focused object. $Z_{min}$ and $Z_{max}$ are the minimum and maximum values of the focal length Z of the imaging optical system 121 respectively, $F_{min}$ and $F_{max}$ are the minimum and maximum values of the F-number F respectively, and $D_{min}$ and $D_{max}$ are the minimum and maximum values of the reciprocal D of the absolute value of the focusable distance respectively. In a case where the focusable distance is infinity, $D_{min}=1/|\infty|=0$. Then, normalized (z, f, d) is calculated by the following expression (2):

$$x = \frac{X - X_{min}}{X_{max} - X_{min}},\ (x = \{z, f, d\},\ X = \{Z, F, D\}) \tag{2}$$

where x is a dummy variable indicating any of (z, f, d), and X is a dummy variable indicating any of (Z, F, D). x is a constant in a case where $X_{min}=X_{max}$. Alternatively, since x has no degrees of freedom, it is excluded from the information about the state of the optical system. D is the reciprocal of the distance because generally, the shorter the focal distance is, the greater the change in the performance of the imaging optical system 121 becomes.

In this example, the CNN 211 includes a first subnetwork 221 and a second subnetwork 223. The first subnetwork 221 has one or more convolutional or full-connection layers. The second subnetwork 223 has one or more convolutional layers. The influential range of the convolutional layer (filter) is determined by the number of layers and the size of the filter. For example, in a case where the number of layers of the filter is 20 and the size is 3×3 pixels, pixels at a maximum distance of 20 pixels from a target pixel are affected. The number and size of filter layers may be determined according to the magnitude of defocus blur to be learned. That is, in a case where the size of defocus blur is 40 pixels, the filter is applied to the entire defocus blur by setting the number of filter layers to 20 and the size to 3×3 pixels.

At the first time of learning, the weight of the CNN 211 (including values of each filter element and bias) is generated from random numbers. The first subnetwork 221 receives information (z, f, d) 202 on the state of the optical system and generates a state map 203 converted into a feature map. The state map 203 is a map indicating the state of the optical system, and has the same number of elements (number of pixels) as that of a single channel component of the training image 201. In this example, the state map 203 is generated based on the number of pixels in the captured image and information about the state of the optical system. In addition, in this example, elements of the same channel in the state map 203 have the same numerical value.

A concatenation layer 222 concatenates the training image 201 and the state map 203 in a specified order in the channel direction. Other data may be connected between the training image 201 and the state map 203. The second subnetwork 223 inputs the concatenated training image 201 and state map 203 and generates an output image 204. In a case where a plurality of sets of training input data are acquired in step S101, the output image 204 is generated for each set. Alternatively, the training image 201 may be converted into a feature map by a third subnetwork, and the feature map and the state map 203 may be connected by the concatenation layer 222.

Next, in step S103 of FIG. 7, the updating unit 114 updates the weight of the CNN from an error between the output image and the ground truth image. In this example, a loss function is a Euclidean norm of a signal value difference between the output image and the ground truth image. However, the loss function is not limited to that of this example. In a case where a plurality of sets of training input data and ground truth images have been acquired in step S101, the loss function value is calculated for each set. The updating unit 114 updates the weight from the calculated loss function value by backpropagation or the like.

Next, in step S104, the updating unit 114 determines whether weight learning is completed. Completion can be determined based on whether the number of iterations of learning (updates of weights) has reached a specified number of times or whether a weight changing amount during updating is smaller than a specified value. In a case where it is determined that the weight learning has not yet been completed, the flow returns to step S101 to acquire one or more sets of new training input data and ground truth images. On the other hand, in a case where it is determined that the weight learning has been completed, the learning is terminated, and the weight information is stored in the memory 111.

Figure 8:
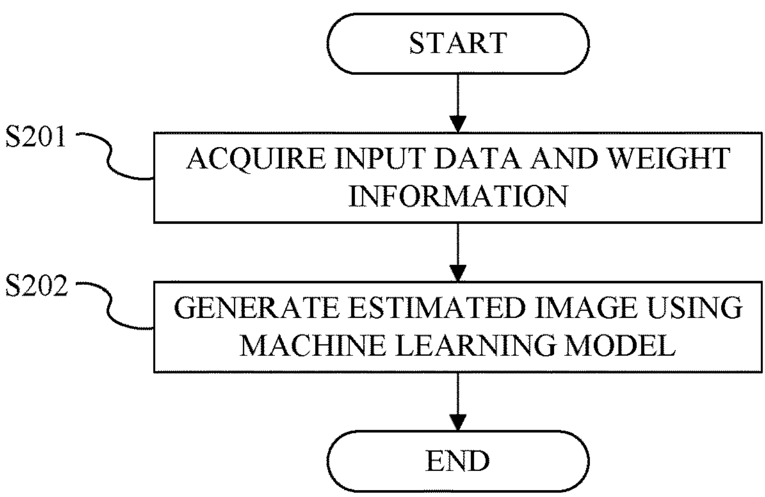
FIG. 8 is a flowchart for generating an estimated image according to Example 1.

Referring now to FIG. 8, a description will be given of estimation (estimation phase) of distance information from a captured image executed by the image processing unit 123. FIG. 8 is a flowchart for generating an estimated image. Each step in FIG. 8 is mainly executed by each component in the image processing unit 123.

First, in step S201, the acquiring unit 123*a* acquires input data and weight information. The input data includes the captured image and information about the state of the optical system that was used to capture the captured image. The captured image to be acquired may be part of the entire captured image. The information about the optical system is (z, f, d) indicating the state of the focal length, the F-number, and the focused object distance of the imaging optical system 121. The weight information can be obtained by reading it from the memory 124.

Next, in step S202, the distance estimating unit 123*b* inputs the input data into the CNN and generates an estimated image. The estimated image is an image in which distance information is estimated from defocus blur caused by the imaging optical system 121 with respect to the captured image. Similar to learning, the CNN illustrated in FIG. 1 is used to generate the estimated image. The CNN uses the acquired learned weights. The input data size (number of pixels) is not limited, and may be larger than the range affected by the convolution layers of the CNN. In a case where the captured image is divided so as to fall within the range affected by the convolutional layers and is input to the CNN, the processing time increases because the distance information is estimated for each divided image. Thus, the machine learning model may have such a structure that the input data may be larger than the range affected by the convolutional layer. In other words, the area of the captured image that is used by the machine learning model in order to obtain (estimate) a partial area of the distance information may be smaller than the entire area of the captured image input to the machine learning model. This example enables the weights for estimating the distance information to be collectively learned for all available (z, f, d) of the imaging optical system. Therefore, the distance information is estimated by the CNN using the same weight for all (z, f, d) captured images.

Due to the above configuration, this example can provide an image processing system that can estimate distance information with high accuracy from defocus blur in a captured image while suppressing a learning load and a stored data amount of the machine learning model.

Example 2

Figure 10:
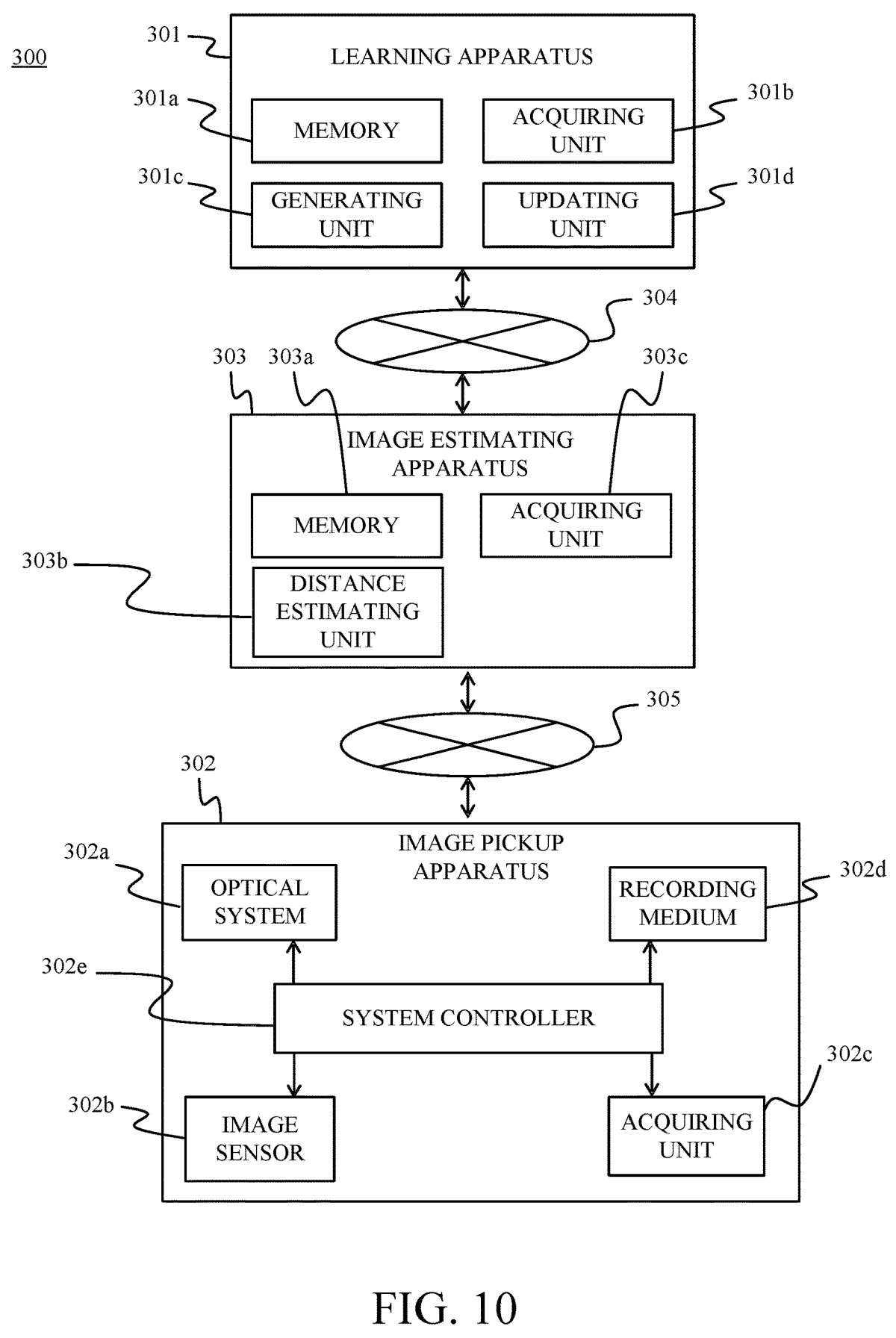
Figure 11:
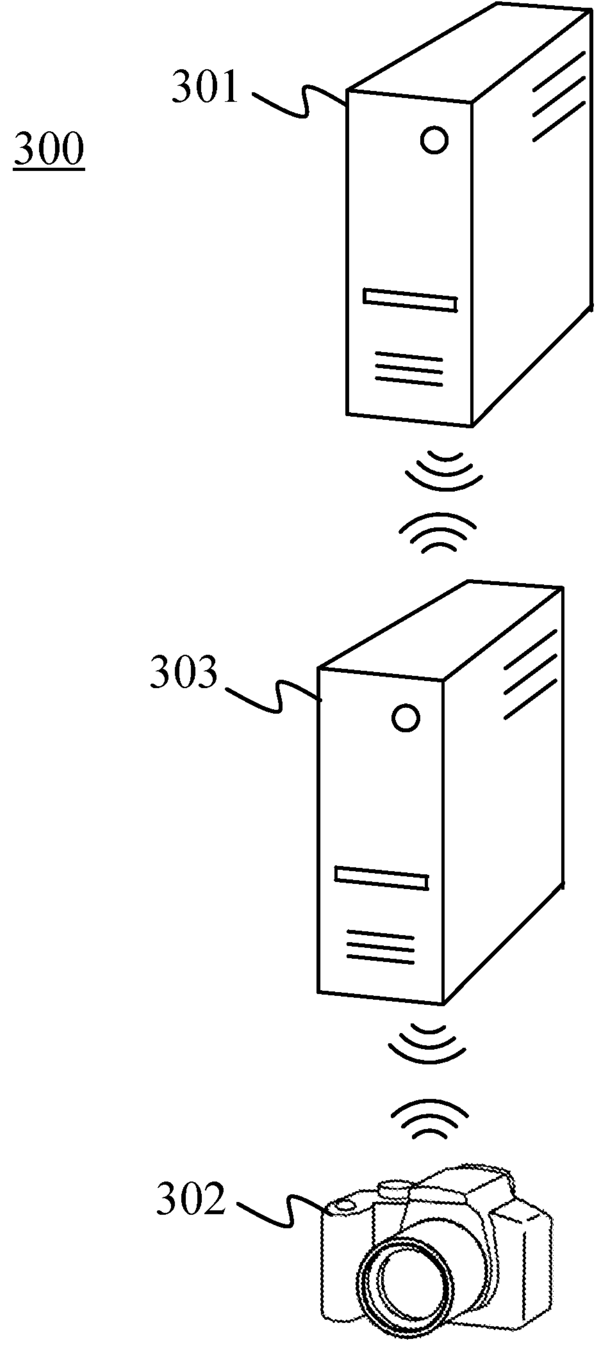
FIG. 11 is an external view of the image processing system according to Example 2.

Referring now to FIGS. 10 and 11, a description will be given of an image processing system according to Example 2 of the disclosure. FIG. 10 is a block diagram of an image processing system 300 according to this example. FIG. 11 is an external view of the image processing system 300.

The image processing system 300 includes a learning apparatus 301, an image pickup apparatus 302, an image estimating apparatus (image processing apparatus) 303, and networks 304 and 305. The learning apparatus 301 and the image estimating apparatus 303 can communicate with each other via the network 304. The image pickup apparatus 302 and image estimating apparatus 303 can communicate with each other via the network 305. The learning apparatus 301 includes a memory 301*a*, an acquiring unit 301*b*, a generating unit 301*c*, and an updating unit 301*d*, and learns weights of a machine learning model that is used to estimate distance information. Learning weights and estimating distance information using weights will be described below in detail.

The image pickup apparatus 302 includes an optical system 302*a*, an image sensor 302*b*, an acquiring unit 302*c*, a recording medium 302*d*, and a system controller 302*e*. The optical system 302*a* collects light incident from the object space and forms an optical image (object image). The image sensor 302*b* converts the optical image into an electrical signal through photoelectric conversion and generates a captured image.

The image estimating apparatus 303 includes a memory 303*a*, a distance estimating unit 303*b*, and an acquiring unit 303*c*. The image estimating apparatus 303 generates an estimated image obtained by estimating distance information about the captured image (or at least part of the captured image) captured by the image pickup apparatus 302. The learned weight information learned by the learning apparatus 301 is used to generate the estimated image. The weight information is stored in the memory 303*a*. The acquiring unit 302*c* acquires the estimated image, and the recording medium 302*d* stores the estimated image. The system controller 302*e* controls a series of operations of the image pickup apparatus 302.

Referring now to FIG. 7, a description will be given of weight learning (learning phase) executed by the learning apparatus 301. Each step in FIG. 7 is mainly executed by each component in the learning apparatus 301. The CNN is used for the machine learning model in this example, but another model can be similarly applied. A description similar to that of Example 1 will be omitted.

First, in step S101, the acquiring unit 301*b* acquires one or more sets of ground truth images and training input data from the memory 301*a*. The memory 301*a* stores training images for a plurality of types of combinations of the optical system 302*a* and the image sensor 302*b*. Example 2 enables the machine learning model to collectively learn weights for estimating distance information for each type of optical system 302*a*. Therefore, first, the type of the optical system 302*a* for weight learning is determined, and a training image is acquired from a set of corresponding training images. The set of training images corresponding to a certain type of optical system 302*a* is a set of images affected by defocus blur with different focal lengths, F-numbers, focused object distances, image heights, azimuths, and the like.

Figure 9:
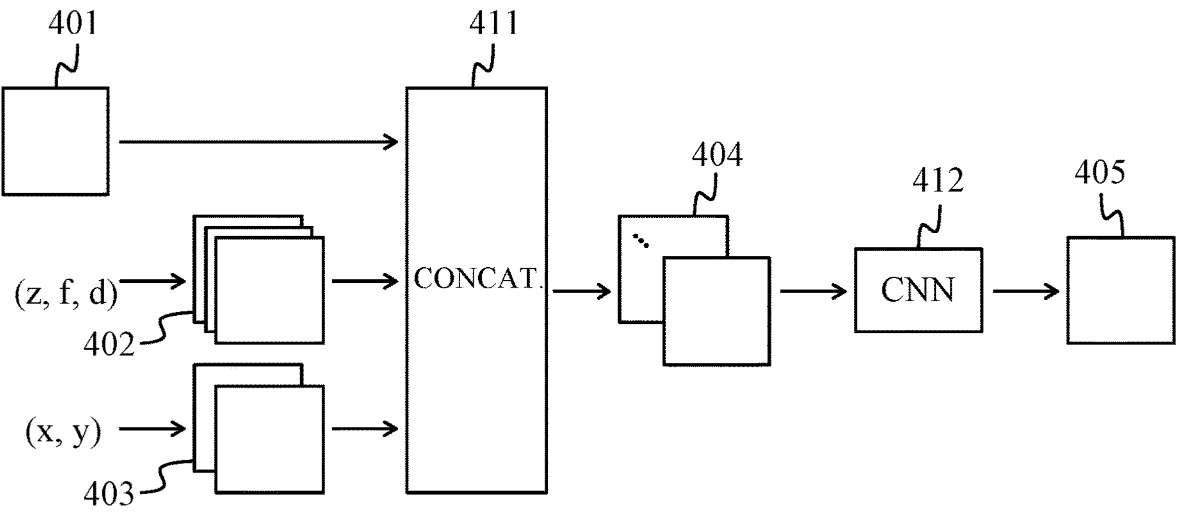
FIG. 9 illustrates a configuration of a machine learning model according to Example 2.

In this example, learning is performed with a configuration of the CNN illustrated in FIG. 9. FIG. 9 illustrates the configuration of the machine learning model in this example. A training input data 404 includes training images 401, state maps 402, and location maps 403. The state map 402 and the position map 403 are generated in this step. A position map includes information about a position of each pixel in a captured image. The state map 402 and position map 403 are maps illustrating (Z, F, D) and (X, Y), respectively, corresponding to defocus blur that is applied to the acquired training images. (X, Y) are coordinates (horizontal direction and vertical direction) of an image plane illustrated in FIG. 12, and correspond to the image height and azimuth in the polar coordinate. This example sets the optical axis of the optical system 302*a* to the origin in the coordinates (X, Y).

Figures 12, 13:
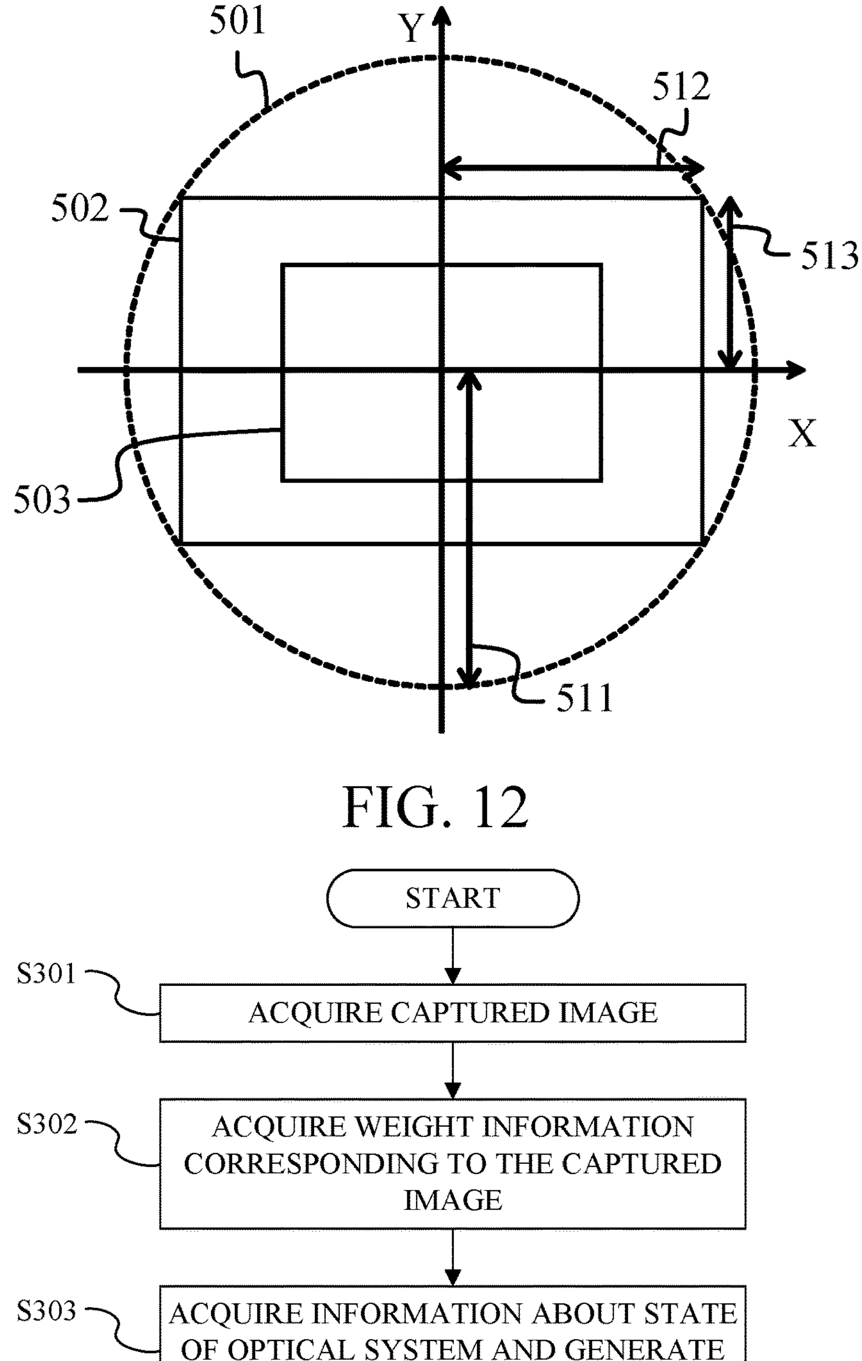
FIG. 12 illustrates a relationship between an image sensor and an image circle of the optical system in Example 2.
FIG. 13 is a flowchart regarding generation of an estimated image according to Example 2.

FIG. 12 illustrates a relationship among an image circle 501 of the optical system 302*a*, a first effective pixel area 502 and a second effective pixel area 503 of the image sensor 302*b*, and the coordinates (X, Y). The size of the image sensor 302*b* is different depending on the type of image pickup apparatus 302. Therefore, the image pickup apparatus 302 includes a type having the first effective pixel area 502 and a type having the second effective pixel area 503. Of the image pickup apparatuses 302 connectable to the optical system 302*a*, the image pickup apparatus 302 having the largest size image sensor 302*b* has the first effective pixel area 502.

The position map 403 in FIG. 9 is generated based on (x, y) obtained by normalizing the coordinates (X, Y). Normalization is performed by dividing (X, Y) by a length (radius of the image circle) 511 based on the image circle 501 of optical system 302*a*. Alternatively, normalization may be performed by dividing X by a horizontal length 512 of the first effective pixel area from the origin and Y by a vertical length 513 of the first effective pixel area from the origin. In a case where (X, Y) is normalized so that the edge of the captured image is always 1, the indicated position (X, Y) is different depending on images captured by the image sensors 302*b* of different sizes even if (x, y) has the same value, and the correspondence between (x, y) and blur cannot be uniquely determined. This problem lowers the estimating accuracy of distance information. The position map 403 is a two-channel map having (x, y) values in each channel component. Polar coordinates may be used for the position map 403, and the method of setting the origin is not limited to that illustrated in FIG. 12.

The state map 402 is a three-channel map having normalized (z, f, d) values in each channel component. That is, in this example, the state map 402 has numerical values indicating at least two of the focal length, the F-number, and the focused object distance of the optical system as elements of different channels. The training image 401, state map 402, and position map 403 have the same number of elements (pixels) per channel. The configurations of the position map 403 and the state map 402 are not limited to those of this example. By dividing the first effective pixel area 502 into a plurality of partial areas and by assigning a numerical value to each partial area, the position map may be expressed by a single channel. Similarly, the state map may be expressed by a single channel by dividing (Z, F, D) into a plurality of partial areas in a three-dimensional space having their respective axes, and by assigning a numerical value to each partial area. The training image 401, the state map 402, and the position map 403 are connected in a predefined order in the channel direction in a concatenation layer 411 of FIG. 9, and the training input data 404 is generated.

Next, in step S102 of FIG. 7, the generating unit 301*c* inputs the training input data 404 into the CNN 412 and generates an output image 405. Next, in step S103, the updating unit 301*d* updates the weight of the CNN from an error between the output image and the ground truth image. Next, in step S104, the updating unit 301*d* determines whether or not the learning has been completed. Information about learned weights is stored in the memory 301*a*.

Referring now to FIG. 13, a description will be given of the estimation of the distance information about the captured image (estimation phase) executed by the image estimating apparatus 303. FIG. 13 is a flowchart regarding generation of the estimated image. Each step in FIG. 13 is mainly executed by each component in the image estimating apparatus 303.

First, in step S301, the acquiring unit 303*c* acquires a captured image (or at least part of the captured image). Next, in step S302, the acquiring unit 303*c* acquires weight information corresponding to the captured image. In this example, weight information for each type of the optical system 302*a* is previously read out of the memory 301*a* and stored in the memory 303*a*. Therefore, the weight information corresponding to the type of the optical system 302*a* that was used to capture the captured image is acquired from the memory 303*a*. The type of the optical system 302*a* that has been used for imaging is specified, for example, from metadata in a file of the captured image.

Next, in step S303, the acquiring unit 303*c* generates a state map and a position map corresponding to the captured image, and generates input data. The state map is generated based on the number of pixels in the captured image and information about the state (Z, F, D) of the optical system 302*a* that was used to capture the captured image. The number of elements (pixels) per channel is equal between the captured image and the state map. (Z, F, D) is specified, for example, from the metadata of the captured image. The position map is generated based on the number of pixels in the captured image and information about the position of each pixel in the captured image. The number of elements (pixels) per channel is equal between the captured image and the position map. The size of the effective pixel area of the image sensor 302*b* that was used to capture the captured image is specified from the metadata of the captured image, and a normalized location map is generated using, for example, the length of the image circle of the optical system 302*a* specified similarly. The input data is generated by concatenating the captured image, the state map, and the position map in a predefined order in the channel direction, as in FIG. 9. The order of steps S302 and S303 is not limited. Alternatively, the state map and the position map may be generated in a case where the captured image is captured, and stored together with the captured image.

Next, in step S304, the distance estimating unit 303*b* inputs the input data into the CNN and generates an estimated image, as in FIG. 9.

Due to the above configuration, this example can provide an image processing system that can estimate distance information with high accuracy from defocus blur in a captured image while suppressing a learning load and a stored data amount of the machine learning model.

A description will now be given of a condition for enhancing the effect of this example. The input data may include information about the pixel pitch in the image sensor 302*b* that was used to capture the captured image. This configuration can highly accurately estimate distance information regardless of the type of image sensor 302*b*. Depending on the pixel pitch, the intensity of pixel aperture deterioration and the magnitude of defocus blur for the pixels change. In the learning phase, the training input data includes information that identifies the pixel pitch corresponding to the training image. For example, it includes a map having elements as normalized pixel pitch values. The normalization may use as a divisor the maximum pixel pitch among a plurality of types of image pickup apparatuses 302. By including a similar map in the input data also in the estimation phase, the estimating accuracy of the distance information can be improved. Such a map is generated based on the number of pixels in the captured image.

Example 3

Figure 14:
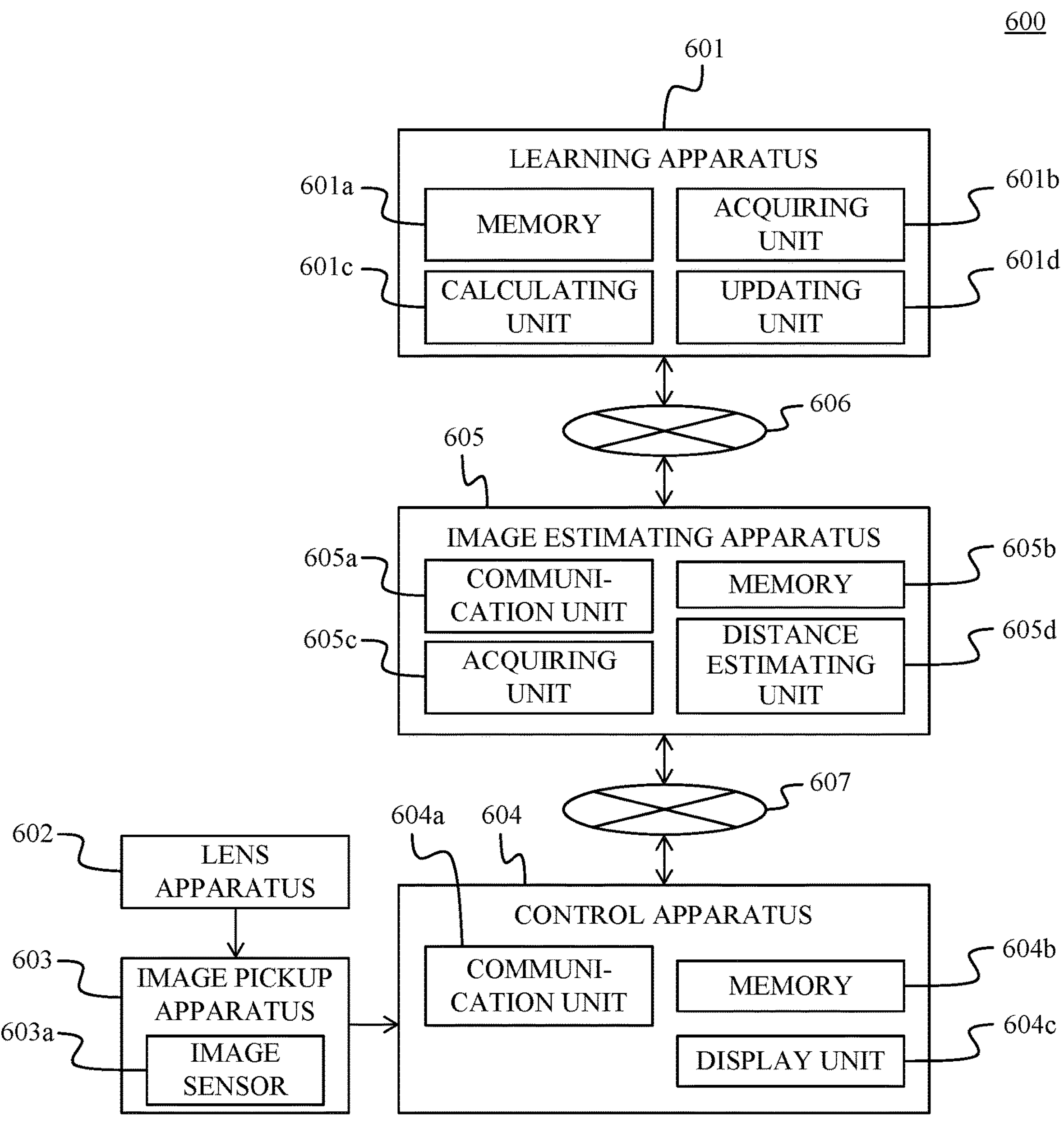
FIG. 14 is a block diagram of an image processing system according to Example 3.
Figure 15:
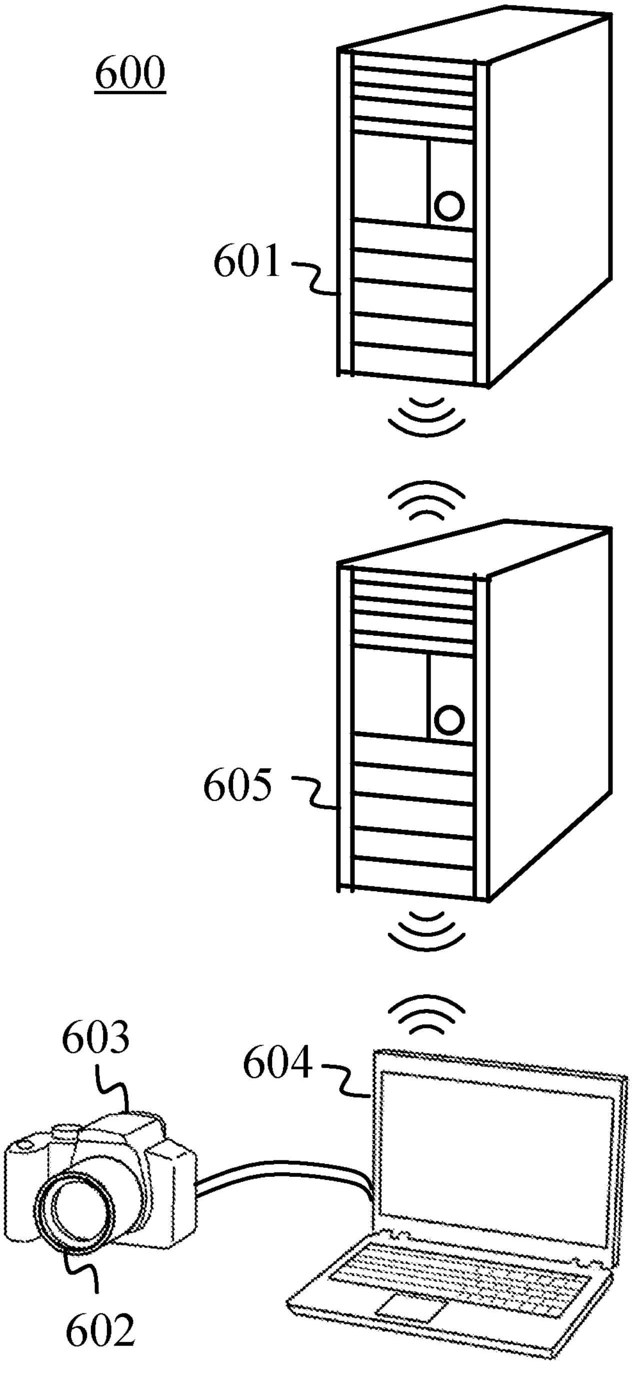
FIG. 15 is an external view of the image processing system according to Example 3.

Referring now to FIGS. 14 and 15, a description will be given of an image processing system according to Example 3 of the disclosure. FIG. 14 is a block diagram of an image processing system 600 according to this example. FIG. 15 is an external view of the image processing system 600.

The image processing system 600 includes a learning apparatus 601, a lens apparatus 602, an image pickup apparatus 603, a control apparatus (first apparatus) 604, an image estimating apparatus (second apparatus) 605, and networks 606 and 607. The learning apparatus 601 and image estimating apparatus 605 can communicate with each other via the network 606. The control apparatus 604 and image estimating apparatus 605 can communicate with each other via the network 607. Each of the learning apparatus 601 and the image estimating apparatus 605 includes, for example, a server. The control apparatus 604 is a device operated by a user, such as a personal computer (PC) or a mobile terminal. The learning apparatus 601 includes a memory 601*a*, an acquiring unit 601*b*, a calculating unit 601*c*, and an updating unit 601*d*, and learns weights for the machine learning model for estimating distance information from a captured image captured with the lens apparatus 602 and the image pickup apparatus 603. Since the learning method of this example is similar to that of Example 1, a description thereof will be omitted.

The image pickup apparatus 603 includes an image sensor 603*a*, and the image sensor 603*a* photoelectrically converts an optical image formed by the lens apparatus 602 and generates a captured image. The lens apparatus 602 and the image pickup apparatus 603 are attachable to each other and detachable from each other, and each of the lens apparatus 602 and the image pickup apparatus 603 is combinable with a plurality of types of counterparts. The control apparatus 604 includes a communication unit 604*a*, a memory 604*b*, and a display unit 604*c*, and controls processing to be executed for the captured image acquired from the image pickup apparatus 603 connected by wire or wirelessly according to the operation of the user. Alternatively, the captured image captured by the image pickup apparatus 603 may be previously stored in the memory 604*b* and may be read out.

The image estimating apparatus 605 includes a communication unit 605*a*, a memory 605*b*, an acquiring unit 605*c*, and a distance estimating unit 605*d*. The image estimating apparatus 605 executes distance information estimating processing of the captured image according to a request from the control apparatus 604 connected via the network 607. The image estimating apparatus 605 acquires learned weight information from the learning apparatus 601 connected via the network 606 in or before estimating the distance information, and uses it to estimate the distance information about the captured image. The estimated image after the distance information is estimated is transmitted to the control apparatus 604 again, stored in the memory 604*b*, and displayed on the display unit 604*c*. The generation of the learning data and the weight learning (learning phase) performed by the learning apparatus 601 are similar to those of Example 1, and a description thereof will be omitted.

Figure 16:
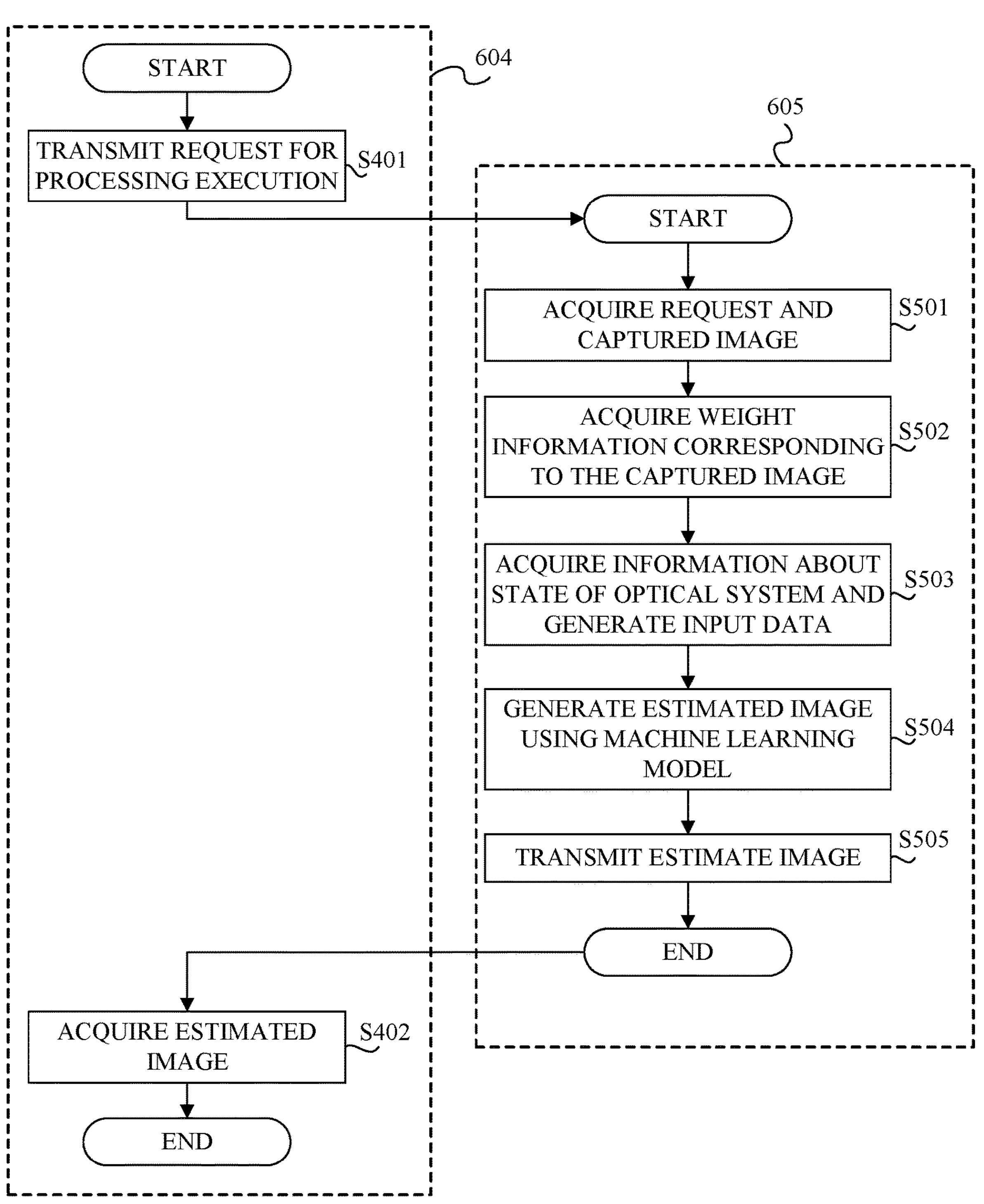
FIG. 16 is a flowchart regarding generation of an estimated image according to Example 3.

Referring now to FIG. 16, a description will be given of estimation of distance information (estimation phase) performed by the control apparatus 604 and the image estimating apparatus 605. FIG. 16 is a flowchart regarding generation of an estimated image according to this example.

First, in step S401, the communication unit 604*a* transmits a captured image and a request for execution of distance information estimating processing to the image estimating apparatus 605.

Next, in step S501, the communication unit 605*a* receives and acquires the captured image and the processing request transmitted from the control apparatus 604. Next, in step S502, the acquiring unit 605*c* acquires learned weight information corresponding to the captured image from the memory 605*b*. The weight information is previously read out of the memory 601*a* and stored in the memory 605*b*.

Next, in step S503, the acquiring unit 605*c* acquires information about the state of the optical system corresponding to the captured image and generates input data. Information for specifying the type, focal length, F-number, and focused object distance of the imaging optical system 602 that was used to capture the captured image is acquired from the metadata of the captured image, and a state map (lens state map) is generated similarly to FIG. 1. The input data is generated by concatenating the captured image and the state map in a predefined order in the channel direction.

Next, in step S504, the distance estimating unit 605*d* inputs the input data into the machine learning model and generates an estimated image in which distance information is estimated. The weight information is used for the machine learning model. Next, in step S505, the communication unit 605*a* transmits the estimated image to the control apparatus 604.

Next, in step S402, the communication unit 604*a* acquires the estimated image transmitted from the image estimating apparatus 605.

Due to the above configuration, this example can provide an image processing system that can estimate distance information with high accuracy from defocus blur in a captured image while suppressing a learning load and a stored data amount of the machine learning model.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

Each of the above examples can provide an image processing method, a storage medium, an image processing apparatus, a manufacturing method of a trained model, and an image processing system, each of which can suppress a learning load and a stored data amount of a machine learning model and estimate distance information with high accuracy from defocus blur in a captured image.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing method comprising:
acquiring input data including a captured image, first information, and second information;
generating a state map based on a number of pixels in the captured image and the first information and generating a position map based on the number of pixels in the captured image and the second information, wherein a number of elements per channel is equal between the captured image and each of the state map and the position map, and wherein the input data further includes the state map and the position map;
inputting the input data into a machine learning model comprising a convolutional neural network including a concatenation layer and a second subnetwork, wherein the concatenation layer concatenates the captured image, the state map, and the position map in a predefined order in a channel direction, and wherein the second subnetwork receives concatenated data from the concatenation layer; and
estimating distance information based on defocus blur in the captured image using the second subnetwork of the machine learning model,
wherein the captured image is obtained by capturing an object using an optical system and an image sensor,
wherein the first information is information about a state of the optical system including at least one of a focal length, an F-number, and a focused object distance,
wherein the second information is information about a respective position of each pixel in the captured image, and
wherein the distance information is information about the distance to the object, at the time of the capturing, which corresponds to the position of each pixel in the captured image.

2. The image processing method according to claim 1, wherein an area of the captured image that is used by the machine learning model to estimate a partial area of the distance information is smaller than an entire area of the captured image input to the machine learning model.

3. The image processing method according to claim 1,
wherein the information about the state of the optical system includes a numerical value indicating at least one of the focal length, the F-number, the focused object distance of the optical system, and
wherein the numerical value is normalized.

4. The image processing method according to claim 1, wherein the state map includes numerical values indicating at least two of the focal length, the F-number, and the focused object distance of the optical system as elements of different channels.

5. The image processing method according to claim 1, wherein elements of the same channel in the state map have the same numerical value.

6. The image processing method according to claim 1, wherein the second information is obtained based on the position of each pixel in the captured image and a radius of an image circle of the optical system.

7. The image processing method according to claim 1, wherein the input data further includes information about a pixel pitch on an image sensor that was used to capture the captured image.

8. A non-transitory computer-readable storage medium storing a program that causes a computer to execute the image processing method according to claim 1.

9. An image processing apparatus comprising at least one processor configured to execute the image processing method according to claim 1.

10. The image processing method according to claim 1, wherein the state map has a same number of elements as a single channel component of the captured image.

11. An image processing system comprising a first apparatus and a second apparatus that can communicate with each other, wherein the first apparatus includes a transmission unit configured to transmit a request for executing processing for the captured image to the second apparatus, and wherein the second apparatus includes:

a receiving unit configured to receive the request;

an acquiring unit configured to acquire input data including the captured image, first information, and second information;

a generating unit configured to generate a state map based on a number of pixels in the captured image and the first information and generate a position map based on the number of pixels in the captured image and the second information, wherein a number of elements per channel is equal between the captured image and each of the state map and the position map, and wherein the input data further includes the state map and the position map; and an estimating unit configured to input the input data into a machine learning model comprising a convolutional neural network including a concatenation layer and a second subnetwork, wherein the concatenation layer concatenates the captured image, the state map, and the position map in a predefined order in a channel direction, and wherein the second subnetwork receives concatenated data from the concatenation layer, and to estimate distance information based on defocus blur in the captured image using the second subnetwork of the machine learning model, based on the request, wherein the first information is information about a state of the optical system including at least one of a focal length, an F-number, and a focused object distance, wherein the second information is information about a respective position of each pixel in the captured image, and wherein the distance information is information about the distance to the object, at the time of the capturing, which corresponds to the position of each pixel in the captured image.

* * * * *